April 6, 1937.   D. C. MEYERS   2,075,821
SEAT
Filed June 12, 1935
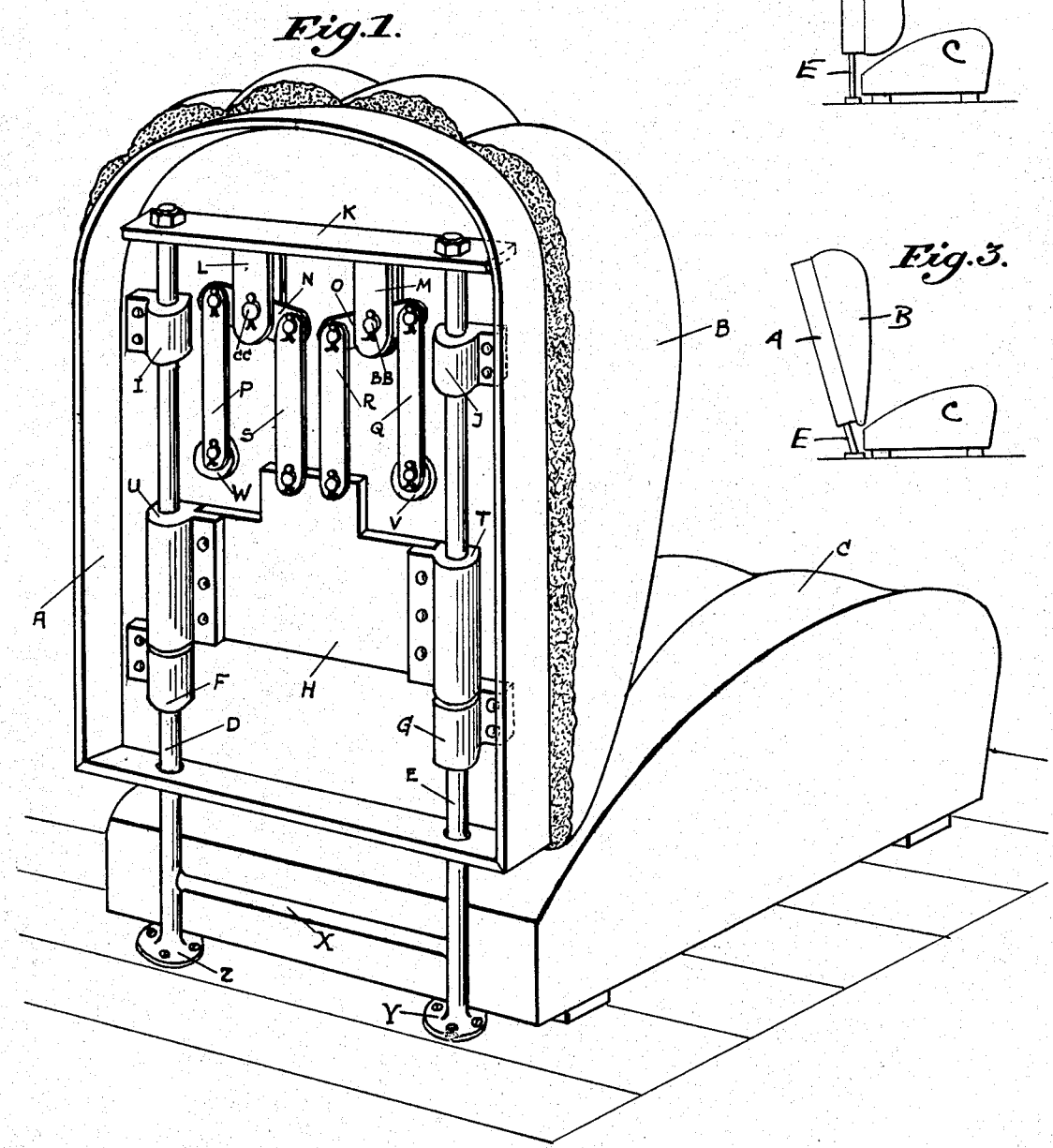
INVENTOR.
David C. Meyers,
BY Karl Fruning
his ATTORNEY.

Patented Apr. 6, 1937

2,075,821

UNITED STATES PATENT OFFICE 2,075,821

SEAT

David C. Meyers, Ithan, Pa.

Application June 12, 1935, Serial No. 26,276

3 Claims. (Cl. 155—5)

The invention relates to a simple unit to improve seating comfort in any kind of upholstered seat provided with a back against which rests the body of the occupant. The seat of the present invention is adapted for use under any and all conditions.

The invention is particularly adapted to seats used in moving vehicles which are subject to shocks and vibrations. Such seats are adapted for use in various means for transportation such as ordinary land vehicles whether moving on a road or on specially prepared surfaces or tracks as well as vehicles moving on the sea or in the air.

Ordinarily such seats consist of a base provided with springs or other resilient means supporting the main weight of the person occupying it. Associated with this is an upright back against which the body may rest. When a vehicle moves over a surface on land speed or irregularities in the surface or both will usually cause a general up and down movement of the person occupying the seat against the resilient base. Similarly in air travel movements of the vehicle may cause movements of the body of the person occupying the seat and in like manner movements of water vehicles and especially those induced by waves or movement of the water may cause movement of the person in the seat. Ordinarily the backs of seats are integral with the base or at least are movable therewith or are not mounted for movement relative thereto. Obviously when the springs and other resilient mechanism of the seat move under stress they cause the body of the occupant to move. When the body of the occupant rests also against the back of the seat this movement of the occupant causes a friction against the stationary back producing discomfort as well as sometimes disarranging and rubbing and wear upon clothing.

In any moving vehicle shocks and vibrations are transferred into more or less vertical movement of the occupant of an upholstered seat through the cushion in the base. Since no approximate vertical movement is provided for in the seat back undesirable strains of considerable magnitude due to a friction between the body and the seat back may be transferred to the body of the occupant. When these strains are taken up by the tension of the body muscles as is usual such tension of the body muscles may produce a very dangerous and tiring effect.

It is a purpose of the present invention to overcome these disadvantages of the present construction of seat. The invention is based upon the appreciation of the fact that comfort and safety may be procured by providing in a seat a resilient base associated with a back member which has movement relative thereto in an approximately vertical direction. Thus an individual sitting upon the resilient base may freely and safely rest the back against the movable back of the seat with the assurance that when exigency of movement causes the body to be reciprocated on the resilient base the movable back against which the occupant rests will move in a generally vertical direction with the body and not cause friction thereagainst. The back movement may be limited in extent and may be provided with any suitable form of dampening mechanism.

It is the common experience to sit forward or upright and withdraw the body entirely from the back of a seat when unusual disturbances of a vehicle cause reciprocation of the body upon the resilient base. This is done to relieve the body of strain and abrasion caused by resting against and contact with the immovable back. By the present invention the back itself is made movable so that it is not necessary to move the body from the back for comfort, safety and convenience.

The invention is adapted to many uses and may be embodied in many forms. For the purpose of clear description the accompanying drawing shows in Figure 1 a perspective from the rear of one form of seat constructed in accordance with the present invention. Figs. 2 and 3 are side elevations of optional arrangements.

The seat in general comprises a base portion C which may be upholstered in any appropriate manner well known in the art generally being provided with springs which are not shown. Mounted on the same support as the base C and adjacent its rear portion are rods D and E. In Fig. 1 these rods are illustrated as mounted substantially vertically by means of bottom flanges Y and Z. Carried by the rods D and E is a back portion made up of a frame member A supporting an upholstered portion B against which the body of the occupant may rest. Normally and in use the frame A may be provided with any suitable cover to conceal and protect the enclosed mechanism about to be described. For purposes of illustration the cover is removed. The rods D and E are held in spaced relation by a cross bar X toward their bottoms and a cross bar or strap K at their tops. In the bottom member of frame A are holes through which the rods D and E pass and fastened to the back of the frame member A are bearings I and F which may slide on the rod D and bearings G and J which may slide on the rod E. Slidably mounted on the rod D between the members I and F is a bearing member U. Slidably mounted on the rod E between the bearings G and J is a bearing member T. Rigidly connected with the bearing members U and T is a weighted bar H. Depending from the cross bar K is a fork member L in which at cross pin C—C is pivoted a lever N at about its center. Depending from and pivoted to one end of the lever N is an arm S pivoted to the weight H. Depending from and pivoted to the other end of the lever N is an arm P pivoted to a bearing W on the back of the frame A and adjacent the rod D. Toward the rod E depending from the cross bar K is a fork M in which on a pin B—B is pivoted a lever arm Q at about its center. Depending from and pivoted to one end of the lever arm O is an arm R pivoted to the weight H. Depending from and pivoted to the other end of the lever O is an arm Q pivoted to a bearing member V on the back of the frame A adjacent the rod E. It will be observed that the bearings F, G, I and J allow the back B to be moved up and down on the rods E and F. This movement is controlled or dampened by the weight H which is connected to the back through the trains of levers described. The downward influence of the weight H tends to hold the back B in its uppermost position with the bearings F and G in contact with the bearings U and T. If before occupying the seat the back B is forced downward slightly, for instance so that the bearing U is about midway between the bearings I and T and the bearing T is about midway between the bearings G and J and then with the back in this position the occupant sitting upon the base C rests his body against the back B it will tend to remain in this intermediate position. Jouncing or reciprocation of the occupant in the seat through the resilient base C may thus cause the movement to be transferred through the body of the occupant to the back B which has a limited movement on the rods D and E as controlled or deadened by the weight H. This relieves or eliminates friction between the body of the occupant and the back B and true seating comfort may be experienced.

The character of the base C and the character of the upholstery B form no part of the present invention. The bearings F, G, I, J, U and T or some of them may be caused to have frictional engagement with the rods D and E and thus act as dampers to the back movement even if the weight H is very light or omitted entirely. Indeed any suitable deadening means such as friction, springs and the like may be employed with the movable back B, the weight H and trains of levers being given as illustrative of one appropriate mechanism.

It will be noted that in Fig. 1 the rods D and E are substantially vertical and the upholstery B is so formed that the vertebra of an occupant when resting against the back B may be substantially vertical. In Fig. 2 is illustrated another form in which the rods D and E are illustrated as substantially vertical while the upholstery is tipped or inclined so that the occupant of the seat may normally incline backward. An optional arrangement is indicated in Fig. 3 in which the upholstery B may be suitably formed to receive the body of the occupant in a vertical or an inclined position and the supporting rods D and E are inclined somewhat backward from the vertical.

Numerous alterations, changes and variations may be made in providing suitable apparatus embodying the invention.

I claim as my invention:

1. A seat comprising a bottom, rods extending substantially vertically in relation to the bottom, a back member slidably carried by the rods, a weight slidably carried by the rods, and lever mechanism supported on the rods, one end of the lever mechanism being connected to the back member and the other end being connected to the weight.

2. A seat comprising a bottom, rods extending substantially vertically in relation to the bottom, a back member slidably carried by the rods, a weight, two lever members pivoted at their centers, and supports carried by the rods for the lever pivots, one end of each lever being connected to the weight and the other end of each lever being connected to the back member.

3. A seat comprising a bottom, rods extending upwardly in relation to the bottom, a back member slidably carried by the rods, a weight, and lever mechanism supported on the rods, one end of the lever mechanism being connected to the back member and the other end being connected to the weight.

DAVID C. MEYERS.